United States Patent [19]

Burger et al.

[11] 4,406,467
[45] Sep. 27, 1983

[54] HIGH PRESSURE ELECTRICAL ISOLATION FLANGE GASKET

[75] Inventors: Edward D. Burger, Plano; Gary A. Kohn, Dallas, both of Tex.

[73] Assignee: Atlantic Richfield Company, Los Angeles, Calif.

[21] Appl. No.: 446,836

[22] Filed: Dec. 6, 1982

[51] Int. Cl.³ .............................................. F16J 15/12
[52] U.S. Cl. .................................. 277/105; 277/234; 277/167.5; 277/901; 285/47; 285/363
[58] Field of Search ................... 285/47, 336, 363; 277/901, 105, 234, 167.5

[56] References Cited

U.S. PATENT DOCUMENTS

| | | | |
|---|---|---|---|
| 1,983,228 | 12/1934 | Hall | 277/105 |
| 1,987,235 | 1/1935 | Janeway | 277/105 |
| 2,422,009 | 6/1947 | Goetze | 277/167.5 |
| 2,552,750 | 5/1951 | Thornhill | 277/167.5 |
| 3,508,766 | 4/1970 | Kessler et al. | 285/47 |
| 4,017,102 | 4/1977 | Henderson | 285/47 |
| 4,108,476 | 8/1978 | Krupp | 285/47 |
| 4,268,070 | 5/1981 | Adams | 285/363 |

*Primary Examiner*—Robert I. Smith
*Attorney, Agent, or Firm*—M. David Folzenlogen

[57] ABSTRACT

An electrical isolation, high pressure resistant gasket for API or ANSI seal ring flanges has four combined features. The gasket has two relatively thick, unyielding metal plates electrically separated from each other by an insulating material. The outer face surfaces of the metal plates are grooved for metal seal rings. The inner face surfaces have metal ridges. The insulating material electrically isolates the plates and the strength of the plates and metal ridges prevent distortion of the plates and blowout of the insulation material. Preferably, the metal ridges extend inwardly overlapping each other. The metal plates may be made of dissimilar metals.

6 Claims, 1 Drawing Figure

U.S. Patent     Sep. 27, 1983     4,406,467
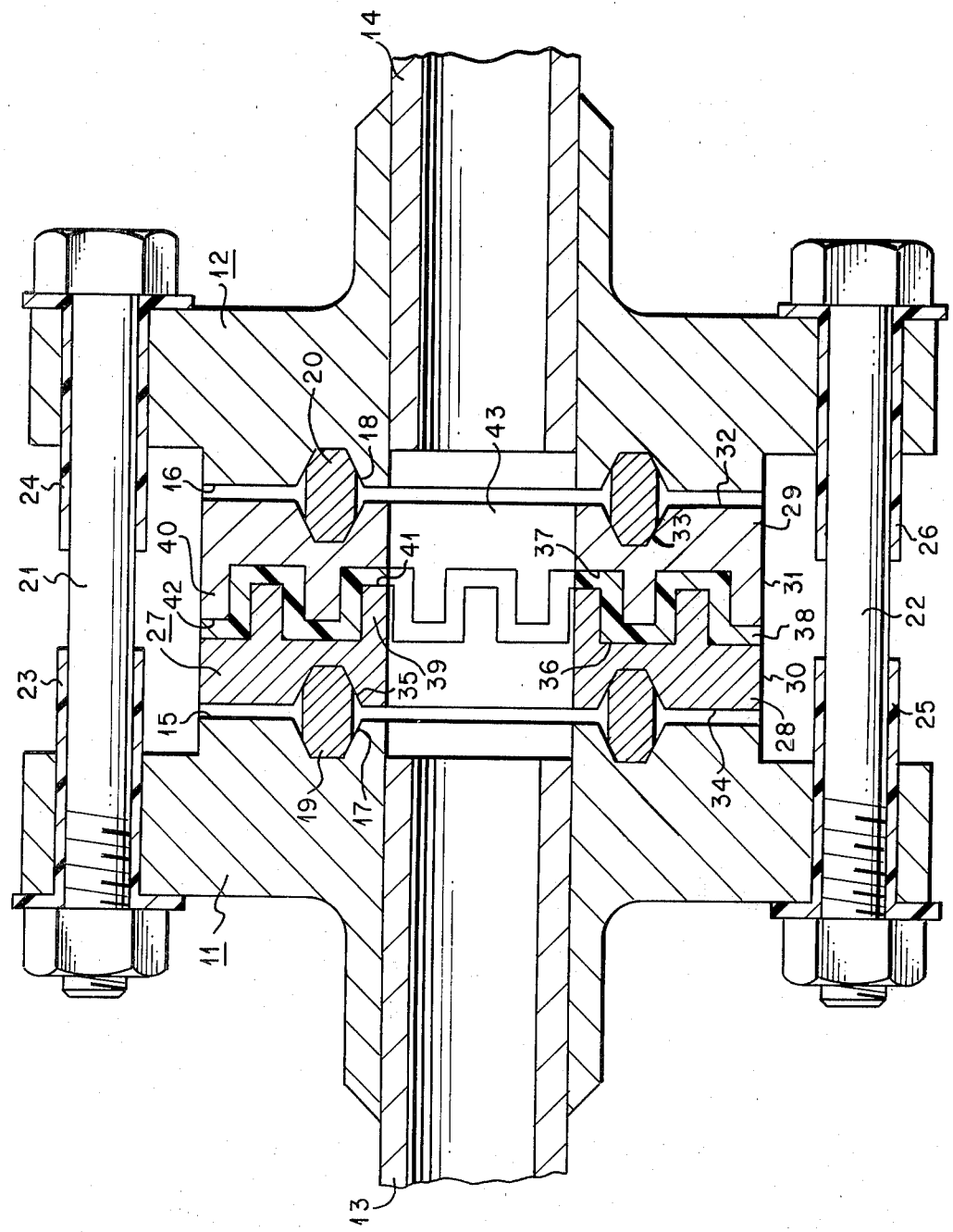

HIGH PRESSURE ELECTRICAL ISOLATION FLANGE GASKET

BACKGROUND OF THE INVENTION

This invention pertains to high pressure insulating flanges for pipelines. More particular, it relates to a specially constructed nonyielding strong electrical isolation gasket for flanges that use metallic seal rings.

In the pipeline industry, insulating couplings or flanges are used for many purposes. For example, the design, construction, operation, maintenance and salvage of metal pipelines, including flowlines and well casing, depend in part on the control of external corrosion of such tubular goods. External corrosion is caused when a pipeline is made up of metal tubular goods having different surface potentials either due to dissimilarity in metal composition or in surface newness or preparation, or when electrically connected corrosive metal tubular goods traverse different electrolytic environments, or when the electrically connected metal tubular goods pick up stray or induced electrical currents which are later discharged into the soil or water around the tubular goods. A similar form of corrosion occurs inside the pipe if the fluid in the pipe is an electrolyte. These types of external corrosion are typically controlled by disrupting the electrical circuits with electrical isolating flanges and by cathodic protection, or protective coatings or wrappings, or both. Many types of electrical isolating flanges have been proposed; but most are unsuitable for use with API and ANSI ring-joint or seal ring flanges and are unreliable for pressures at or above 2500 p.s.i.g.

It would, therefore, be desirable to provide a more reliable high pressure electrical isolating API or ANSI ring-joint flange, especially one that is useful between dissimilar metals.

SUMMARY OF THE INVENTION

A specially constructed, electrical isolation, high pressure resistant gasket for use between the two metal half flanges of a high pressure, right-joint or seal ring flange. The specially constructed gasket is a unique combination of four features. The gasket is comprised of two strong unyielding metal plates or layers. The outer face surface or side of each plate is adapted for normal metal seal ring use. The metal plates are relatively thick especially in the plane or area of the seal ring grooves. The metal plates are electrically isolated from each other by a nonconducting electrical insulating material located between the inner sides and ridges of the plates. The inner sides of the strong metal plates have ridges formed by sandblasting, grooving, drilling indentations in, or extending the inner face surface of the metal plates. The ridges prevent the nonconducting material between the inner sides of the plates from being forced out due to the high radial differential pressure between the inside of the flange and the atmosphere. The strong electrical isolation gasket and flanges retain the sealing strength and advantages of metal seal rings. The metal plates of the gasket remain electrically isolated because the plates do not yield when the flange bolts are torqued to specification. Radial blowout of the electrical insulating material is prevented by the unyielding strength of the plates and the metal ridges. The metal ridges and insulating material are sufficiently strong to withstand a pressure differential of 2500 p.s.i. In a preferred embodiment, the ridge or ridges on one plate extend inwardly beyond the tip or crest of a ridge on the other plate so that the ridges inwardly overlap each other. In this embodiment, the metal ridges and insulating material are significantly safer at higher pressure differentials. The gasket has a further advantage. The plates may be made of electrically dissimilar metal and matched with the metal used in the flange halves or pipe material on either side of the gasket.

BRIEF DESCRIPTION OF THE DRAWING

The drawing is a side longitudinal cross-sectional view of a preferred embodiment of two high pressure flange halves and the specially constructed isolation gasket of this disclosure.

DETAILED DESCRIPTION OF THE PREFERRED EMBODIMENTS

In the drawing, two metal American Petroleum Institute ("API") or American National Standards Institute ("ANSI") metal, high pressure, bolt-type, welding neck, half flange members 11 and 12 are shown aligned, mounted on and connecting cylindrical metal pipe members 13 and 14. As used in this disclosure, the words high pressure refer to operating pressures at or above 2500 p.s.i. Of course, the gasket may also be used for lower pressures if desired. Welding neck flanges are normally used on pipe members at pressures above 2500 p.s.i. The welds are not shown in the drawing. Although the flange halves are shown mounted on standard pipe, it is to be understood that the flange halves may be any type of flange halves and that they may be mounted on any type of system where a high pressure electrical isolating flange joint is desired. For example, the pipe may be a flowline or casing. A flange half may be a part of a valve or casing wellhead. The flange halves may be made of dissimilar metals, for example, one half may be carbon steel and the other half stainless steel. The flange halves are bored so that fluid flowing in the pipe passes through the flange connection. The flange halves have inner surfaces 15 and 16 respectively. These inner surfaces are grooved with standard seal ring grooves 17 and 18, respectively, for use with a metallic seal ring. Standard ring-joint flanges are usually marked with the ring groove number. In this invention, two standard metal API or ANSI seal rings 19 and 20 are required for reasons hereinafter made apparent. The bolt-type flange halves have the usual bolt holes which are usually provided in multiples of four with pairs on the same center or diameter line. Full length threaded bolts or partially threaded bolts with hexagonal heads may be used. Shown are partially threaded hexagonal head bolts 21 and 22. The bolts themselves may be insulated from both or one of the flange halves in any standard fashion. For illustration purposes, four insulating sleeves 23, 24, 25 and 26 are shown. Requirements for alignment, assembly and bolt loads are given in API or ANSI standards and are dependent on the use of the flange, service temperatures and pressures, and their cyclic changes. These conditions develop forces and moments in the piping and flange joint which must be withstood by specially constructed, high pressure, electrical isolation flange gasket 27 which is shown located between the two flange halves.

The gasket is comprised of outer metal plates or layers 28 and 29 which may be made of dissimilar metals to match the flange halves or pipe members, for example, carbon steel and stainless steel. The metal layers have substantial thickness with perimeter surfaces 30 and 31. The perimeter may have any shape and width or diameter so long as the layers or plates do not interfere with the bolt holes in the flange halves. Ordinarily, the plates will be circular and have about the same diameter as grooved surfaces 15 and 16 of the flange halves.

Metal layer 29 has outer face surface 32 which has seal ring groove 33 which is adapted to coact with seal ring 20 which in turn coacts with groove 18 in flange half 12 and form a high pressure seal. Similarly, metal layer 28 has outer face surface 34 which has seal ring groove 35 which is adapted to coact with seal ring 19 which in turn coacts with groove 17 in flange half 11 to form a high pressure ring-joint seal.

Metal layers 28 and 29 have inner face surfaces 36 and 37 respectively which face each other and are separated from electrical contact with each other by insulating layer or material 38. Face surface 36 and 37 have a series of metal ridges which may be formed by any means, for example, sandblasting each inner face surface, or grooving these face surfaces, or drilling indentations in the face surfaces, or forming extensions on the face surfaces. Shown in the drawing are a series of metal ridges 39 and 40 respectively. In the preferred embodiment shown, ridges 39 have crest surfaces 41 and metal ridges 40 have crest surfaces 42. The crests on the metal ridges extend inwardly by a distance such that crest surfaces 41 extend longitudinally inward beyond crest surfaces 42 and vice versa. In any embodiment, insulating layer 38 extends around the crests of the ridges and keeps the ridges from electrically contacting each other. Metal layers 28 and 29 and insulating layer 38 have aperature 43 extending through the gasket. The metal ridges are located between this aperature and perimeter surfaces 30 and 31. The ridges are located, preferably continuously, around the aperature. The aperature is adapted to allow fluid flow between the bored portions of the flange halves when the flange halves are aligned and installed. The high internal pressure inside pipe members 13 and 14 is exerted against the walls of the aperature. In ordinary cases, this high pressure differential could cause insulating layer 38 to extrude out from between metal layers 28 and 29. But metal ridges 39 and 40 are sufficiently thick not to distort or yield when the insulating material is subjected to the pressure inside the pipe line. Moreover, the metal ridges contain the insulating material and prevent it from being forced out by the high radial differential pressure between the aperature and the atmosphere. The metal ridges and insulating material are sufficiently strong to withstand a pressure of 2500 p.s.i. inside aperature 43 with atmospheric pressure being exerted on perimeter surfaces 30 and 31 of the metal layers when the gasket is mounted between bolt-type flange halves 11 and 12 and bolts 21 and 22 are torqued to ANSI or API specifications. In the preferred embodiment shown, the ridges have crests extending continuously around the aperature and extending inwardly beyond each other so that a part of each ridge overlaps a part of a ridge on the other layer. This arrangement is preferred because it better contains the insulating material and provides added strength and safety to the gasket.

Metal layers 28 and 29 are sufficiently thick in all places especially in the plane or area of seal ring grooves 33 and 35 to prevent the gasket from bowing and to withstand without significantly yielding the stresses created when the gasket is installed between the flange halves and the flange halves are bolted together and the bolts are torqued to specification. Preferably, the thickness of the metal layers at the valley of the seal ring grooves will be as thick as the pipe member on which a flange half is mounted.

Similarly, insulating layer 38 is made of electrically non-conducting plastic, elastomer or other material that has sufficient compressive strength to rigidly support the metal plates 28 and 29, yet the insulating material is not brittle enough to crack when the isolation gasket is installed and the flange is placed in service.

The present invention has been described herein with reference to particular embodiments thereof. It will be appreciated by those skilled in the art, however, that various changes and modifications can be made therein without departing from the scope of the invention as present.

Therefore, we claim:

1. An electrical isolation flange gasket for high pressure use between two bored, bolt-type flange halves whose inner surfaces are grooved for use with a metallic seal ring, said gasket comprising first and second outer metal layers having substantial thickness; each of said metal layers having a perimeter surface, an aperature extending therethrough, an outer face surface and an inner face surface; said aperature adapted to allow fluid flow between the bored portions of each of said flange halves when the flange halves are properly aligned and installed; said outer face surface of each of said metal layers being adapted to face an inner surface of one of said flange halves and being grooved and adapted for use with a metallic seal ring; said inner face surface of each of said metal layers facing each other and having at least one ridge located between said aperature and said perimeter, said ridges located around said aperature; said metal layers being sufficiently thick throughout to withstand without significant yielding the stresses created when said gasket is installed between said flange halves and the flange halves are bolted together and torqued to specification; an inner layer of an electrical insulating material between said two outer metal layers and the crests of each of said ridges and the other metal layer, said electrical insulating material separating said metal layers from electrical contact with each other, and said metal ridges and said electrical insulating material being sufficiently strong to withstand a pressure of 2500 p.s.i. inside said aperature with atmospheric pressure exerted on said perimeter surface of each of said metal layers when said gasket is mounted between said bolt-type flange halves and said bolt-type flange halves are torqued to specification.

2. The flange gasket of claim 1 wherein the metal layers are comprised of dissimilar metals.

3. The flange gasket of claim 1 wherein the metal ridges have crests extending continuously around the aperature, said crests extending inwardly beyond each other so that a part of each of said ridges overlaps a part of a ridge on the other metal layer.

4. The flange gasket of claim 3 wherein the metal layers are comprised of dissimilar metals.

5. The flange gasket of claim 3 wherein there are at least two metal ridges on at least one of inner face surfaces of one of the layers.

6. The flange gasket of claim 5 wherein the metal layers are comprised of dissimilar metals.

* * * * *